United States Patent [19]
Chiu

[11] Patent Number: 5,381,640
[45] Date of Patent: Jan. 17, 1995

[54] AUTOMATIC PACKING AND SEALING APPARATUS

[76] Inventor: Shao-Yi Chiu, No. 191, Yen Ping Road Sec. 3, Tou Nan Chen, Yun Lin Hsien, Taiwan, Prov. of China

[21] Appl. No.: 142,912

[22] Filed: Oct. 29, 1993

[51] Int. Cl.⁶ ............... B65B 9/06; B65B 9/20; B65B 41/16; B65B 51/28
[52] U.S. Cl. ............................ 53/77; 53/550; 53/374.9; 53/389.4
[58] Field of Search ............... 53/77, 550, 555, 374.8, 53/374.9, 389.4, 385.1

[56] References Cited

U.S. PATENT DOCUMENTS

| | | | |
|---|---|---|---|
| 3,461,271 | 8/1969 | Reitzes | 53/550 X |
| 3,583,888 | 6/1971 | Shanklin | 53/389.4 |
| 3,886,713 | 6/1975 | Mitchell et al. | 53/374.9 |
| 4,063,400 | 12/1977 | Millevoi | 53/77 X |
| 4,697,401 | 10/1987 | Kessler et al. | 53/374.9 |
| 4,924,659 | 5/1990 | Watanabe | 53/555 X |
| 4,939,889 | 7/1990 | Watanabe | 53/550 X |
| 5,056,295 | 10/1991 | Williams | 53/550 X |
| 5,131,213 | 7/1992 | Shanklin et al. | 53/374.8 |
| 5,269,119 | 12/1993 | Tolson | 53/550 X |

*Primary Examiner*—Horace M. Culver
*Attorney, Agent, or Firm*—Browdy and Neimark

[57] ABSTRACT

An antomatic packing and sealing apparatus, wherein a plastic film drum with plastic film is placed on a first roller shaft and a second roller shaft and between two adjusting sleeve members freely slidably fitted on the second roller shaft, whereby the placement of the plastic film is easy and the position thereof is adjustable. A substantially U-shaped stretching lever is disposed for forcing open the plastic film against the attaching force so as to facilitate the transferring and packing of the plastic film. A blowing tube is diagonally fixed on a frame body under a front conveying belt assembly, whereby an operator is able to blow diagonally inwardly into the plastic film to expand the same permit an article on the front conveying belt assembly to be packed closer to a film-sealing position so as to save material and make the package more impacted. Activating plates are disposed on two sides of the sealing blades, whereby during the conveying process, if the article does not completely pass through the sealing blade or the operator incautiously extends his hand into a position under the sealing blades, before the sealing blades touch the article, the activating plates will first touch the article and be moved upward, so that the sensing plates connected with the activating plates will ascend along therewith and interrupt sensing switches so as to immergently stop the packing and sealing apparatus for ensuring the safety of the operator, reducing loss of the article and protect the packing and sealing apparatus.

1 Claim, 19 Drawing Sheets

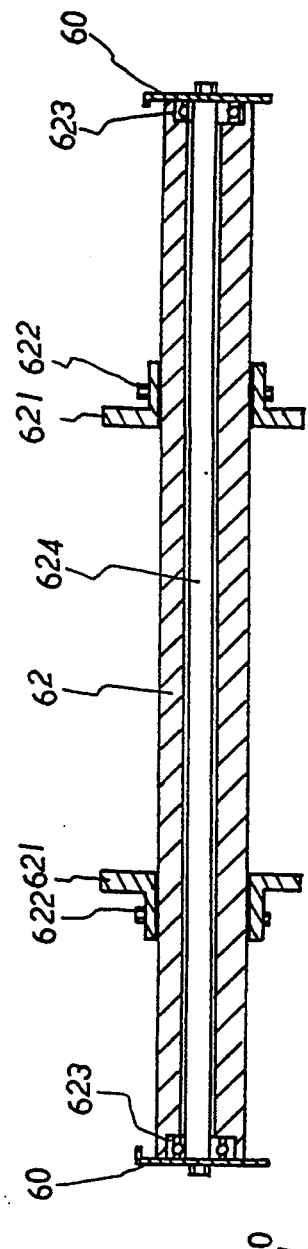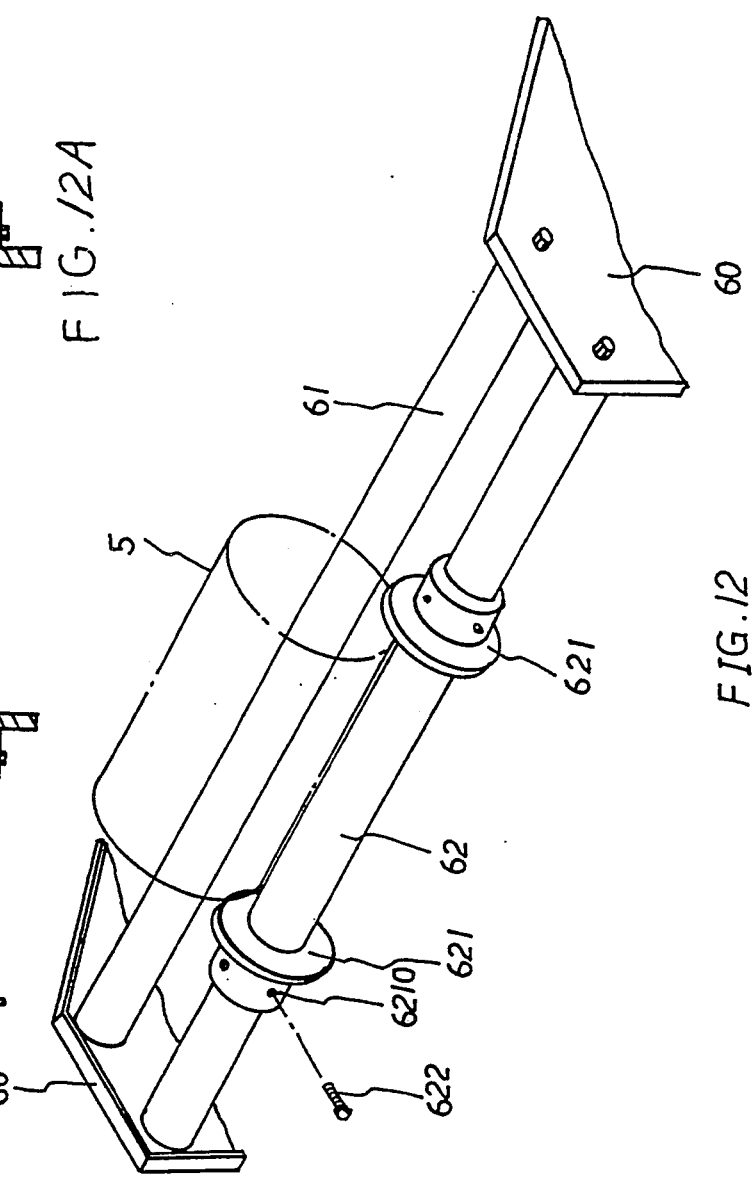
FIG.12A
FIG.12

AUTOMATIC PACKING AND SEALING APPARATUS

BACKGROUND OF THE INVENTION

The present invention relates to an automatic packing and sealing apparatus, wherein a plastic film drum with plastic film is placed on a first roller shaft and a second roller shaft and between two adjusting sleeve members freely slidably fitted on the second roller shaft, whereby the placement of the plastic film is easy and the position thereof is adjustable. A substantially U-shaped stretching lever is disposed for forcing open the plastic film against the attaching force so as to facilitate the transferring and packing of the plastic film. A blowing tube is diagonally fixed on a frame body under a front conveying belt assembly, whereby an operator is able to blow diagonally inwardly into the plastic film to expand the same permit an article on the front conveying belt assembly to be packed closer to a film-sealing position so as to save material and make the package more impacted. Activating plates are disposed on two sides of the sealing blades, whereby during the conveying process, if the article does not completely pass through the sealing blade or the operator incautiously extends his hand into a position under the sealing blades, before the sealing blades touch the article, the activating plates will first touch the article and be moved upward, so that the sensing plates connected with the activating plates will ascend along therewith and interrupt sensing switches so as to emergently stop the packing and sealing apparatus for ensuring the safety of the operator, reducing loss of the article and prolong the using life of the packing and sealing apparatus.

The conventional packing and sealing device is shown in FIGS. 1 and 2. Such packing and sealing device includes mainly a plastic film-feeding system 1, a packing system 2, a sealing system 3 and a transferring system 4, wherein as shown in FIGS. 3 and 4, the plastic film-feeding system 1 includes a feeding roller shaft 11, a clamping roller shaft 12 and a tension-adjusting shaft 13. The feeding roller shaft 11 is fixed on two shaft seats 14 and provided with two fixing means 111 for clamping a plastic film drum 5 fitted on the feeding roller shaft 11. Two swinging arms 15 are disposed on two sides of the tension-adjusting shaft 13 and a guiding rod 16 is connected at the ends of the swinging arms 15. A tension-adjusting thread rod 131 is disposed on the tension-adjusting shaft 131 and an adjusting block 132 is screwed with the thread rod 131.

The above arrangements are operated in such a manner that when starting the packing and sealing device, the feeding roller shaft 11 is first taken out and one of the fixing means 111 is detached. Then, the plastic film drum 5 is installed onto the feeding roller shaft 11 and the fixing means is fitted thereon to secure the plastic film drum 5. Thereafter, the plastic film is pulled out of the drum 5 to wind through the clamping roller shaft 12 and the tension-adjusting shaft 13 toward the sealing blades. To keep a suitable tension of the plastic film with respect to different sizes of articles to be sealed so as to facilitate the sealing operation, the tension of the plastic film is controlled by moving the adjusting block 132 of the tension-adjusting thread rod 131.

However, above feeding roller shaft 11 and tension-adjusting shaft 13 have several shortcomings as follows:

1. The plastic film drum 5 is fixed on the feeding roller shaft 11, so that when the plastic film is used up, the feeding roller shaft 11 and the fixing means 111 thereof must be detached for taking out the empty drum and installing a new one onto the feeding roller shaft 11. Then, the new drum is clamped by the fixing means 111 for further operation. Such procedure is troublesome and time-costing.

2. During the feeding of the plastic film, the drum 5 continuously abrades against the feeding roller shaft 11. Therefore, the drum is liable to be worn out and make the feeding of the plastic film unstable.

3. The tension of the plastic film is controlled by the adjusting block 132 of the tension-adjusting thread rod 131 of the tension-adjusting shaft and the entire tension-adjusting means is located in the plastic film-feeding system 1. Therefore, for ensuring the safety, when adjusting the tension of the plastic film, the device must be first stopped and then the adjusting block 132 can be adjusted for controlling the tension of the plastic film. Such stopping, adjusting, starting and testing procedures are repeatedly performed until the tension of the plastic film is correct. The above procedures are time-costing and labor-wasting.

4. The above adjusting operation is performed by way of varying the eccentric distance and the weight of the adjusting block 132. In case the plastic film is fed at varying speeds or intermittently during the feeding process, the guiding rod is apt to vibrate and the tension of the plastic film can hardly be constant. As a result, the feeding, packing and sealing operations cannot be performed stably.

Please further refer to FIG. 5. The plastic film is fed by the feeding system 1 and turned and guided by the guiding rod 19 into the packing system 2 in a double folded pattern. The packing system 2 of the conventional packing and sealing device includes a conveying platform 21 and an upper and a lower triangular turning guiding boards 22, 23, whereby an upper sheet of the folded plastic film goes through the upper guiding board 22 and turns 90 degrees, while the lower sheet thereof goes through the lower guiding board 23 and turns 90 degrees. Therefore, the upper and lower sheets are 90 degrees turned by the upper and lower triangular guiding boards 22, 23 and meet at a transverse sealing blade 31 of the sealing system 3. The lower guiding board 23 is fixed, while the upper guiding board 22 is fixed on an adjustable support 24 which can be vertically moved by rotating a wheel 26 to drive a thread rod 26 so as to meet the requirement of different sizes of articles.

As shown in FIG. 7, the article is packed in such a manner that the article is conveyed to a position under the upper turning guiding board 22 by means of the conveying platform 21. (The level of the upper turning guiding board 22 can be controlled by the adjustable support 24 so as to adjust the distance between the conveying platform 21 and the upper turning guiding board 22, making the article pass therethrough smoothly.) When the article goes between the conveying platform 21 and the upper turning guiding board 22 and is spaced from the transverse sealing blade 31 by a certain distance, the sealing blade 31 will be pressed down to thermally seal a front end portion of the plastic film in front of the article. At this time, the lateral open ends of the plastic film 5 are clamped on a clamping-/feeding chain assembly 40 and the same continuously clamps and pulls the plastic film forward. Therefore, the plastic film 5 and the article will go forward simultaneously and pass through the transverse sealing blade 31. After a rear end of the article passes through the sealing blade 31 for a certain distance, the sealing blade 816 is again pressed down to seal the rear and lateral ends of the plastic film 5 and thus make the article totally sealedly enveloped by the plastic film 5 and complete the packing and sealing process.

The above packing and sealing operation has a serious problem that when the article is transferred by the conveying platform 21 under the upper guiding board 22, because the plastic film is soft and is difficult to be deformed according to the shape of the article, the corners of the article are apt to engage with the plastic film. (The larger the article is, the more serious the situation is.) Therefore, the plastic film is likely to deform or break and the package will be crimped. In addition, excessive plastic film will be wasted.

Moreover, as shown in FIGS. 6 and 7, the transverse and longitudinal sealing blades 31, 30 are fixed above the upper swinging arm 32 and sealing blade seats 34 are disposed above the lower swinging arm 33. Multiple support rods 341 are fixed under the sealing blade seats 34. A spring 342 is fitted on the support rod 341 which extend through the lower swinging arm 33 to be secured by nuts 343 so as to buffer the vertical reciprocating movement of the sealing blade seats 34. Such structure can only achieve the object of sealing the plastic film, while it is possible that the article does not completely pass through the transverse sealing blade 31 or the operator incautiously extends his hand into a position under the sealing blade. At this time, no safety device is provided to emergently stop the sealing system for ensuring the safety of the operator, reducing loss of the article and protect the packing and sealing apparatus.

SUMMARY OF THE INVENTION

It is therefore a primary object of the present invention to provide an automatic packing and sealing apparatus which is able to eliminate the aforesaid shortcomings existing in the conventional device. The features of the present invention are as follows:

1. The plastic film is placed on a first and a second roller shafts and clamped by two adjusting sleeve members of the second roller shaft, so that after the plastic film is used up, the plastic film drum can be replaced by a new one without detaching the roller shafts or fixing means. Therefore, the replacement of the plastic film is easy and the position of the plastic film drum can be adjusted during the operation of the apparatus without stopping the same.
2. The tension of the plastic film is contolled and adjusted directly by the tension-adjusting shaft without stopping the operation so that the time and labor are saved.
3. A coil spring is used to control and adjust the tension of the plastic film, so that the vibration thereof is eliminated and the tension of the plastic film is kept constant during the feeding procedure. Therefore, the sealing operation can be performed smoothly.
4. The plastic film is wound through a stretching rod and a substantially U-shaped stretching lever which force open the plastic film against the attaching force and facilitate the transferring and packing of the plastic film.
5. A blowing tube is diagonally fixed on a frame body under a front conveying belt assembly, whereby an operator is able to blow air diagonally inwardly into the plastic film to expand the same and permit an article on the front conveying belt assembly to be packed closer to a film-sealing position so as to save material and make the package more impacted.
6. Activating plates are disposed on two sides of the sealing blades, whereby during the conveying process, if the article does not completely pass through the sealing blade or the operator incautiously extends his hand into a position under the sealing blades, before the sealing blades touch the article, the activating plates will first touch the article and be moved upward, so that the sensing plates connected with the activating plates will ascend along therewith and interrupt sensing switches so as to immergently stop the packing and sealing apparatus for ensuring the safety of the operator and reducing loss of the article.

BRIEF DESCRIPTION OF THE DRAWINGS

FIG. 3A is a detailed exploded view of a partially broken away section of the circled area labeled A in FIG. 3.

FIG. 10A is a detailed exploded view of a partially broken away section of the circled area labeled A in FIG. 10;

FIG. 12 shows the tension-adjusting shaft of the present invention;

FIG. 12A is an axial cross section of the second roller shaft 62 in FIG. 12;

DETAILED DESCRIPTION OF THE PREFERRED EMBODIMENT

Figure 1:
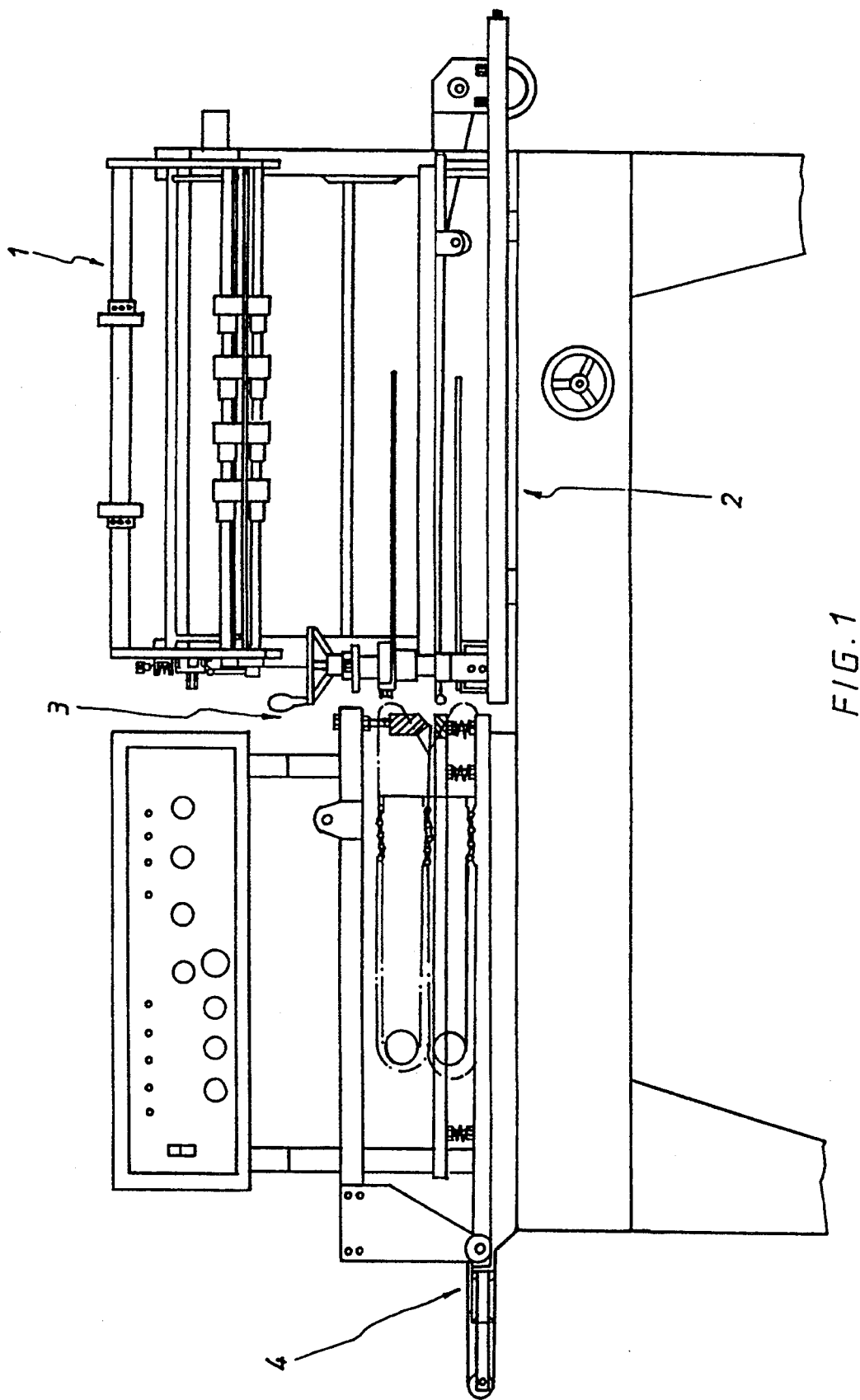
FIG. 1 is a front view of a conventional packing and sealing device.
Figure 2:
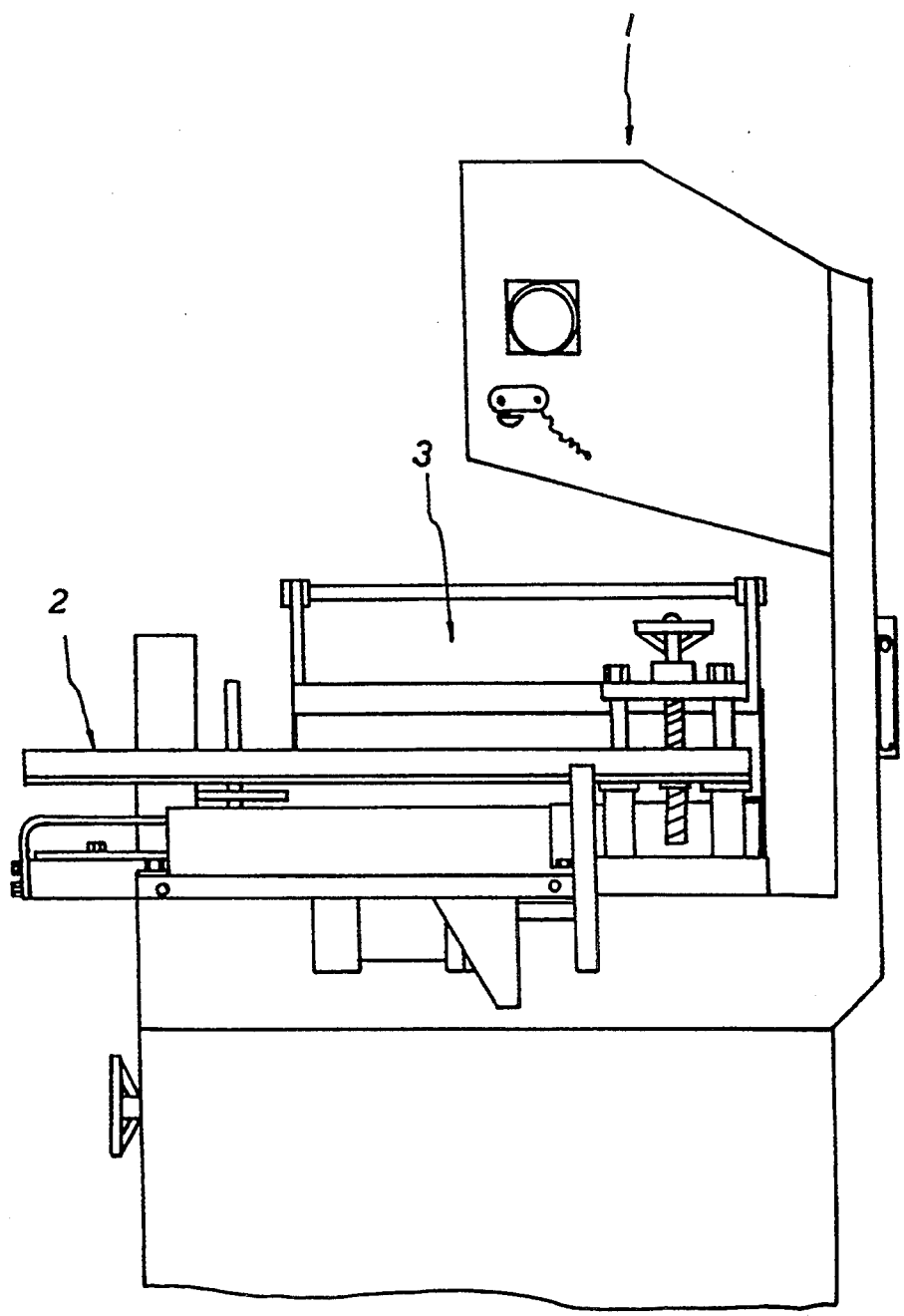
FIG. 2 is a right side view according to FIG. 1.
Figure 3:
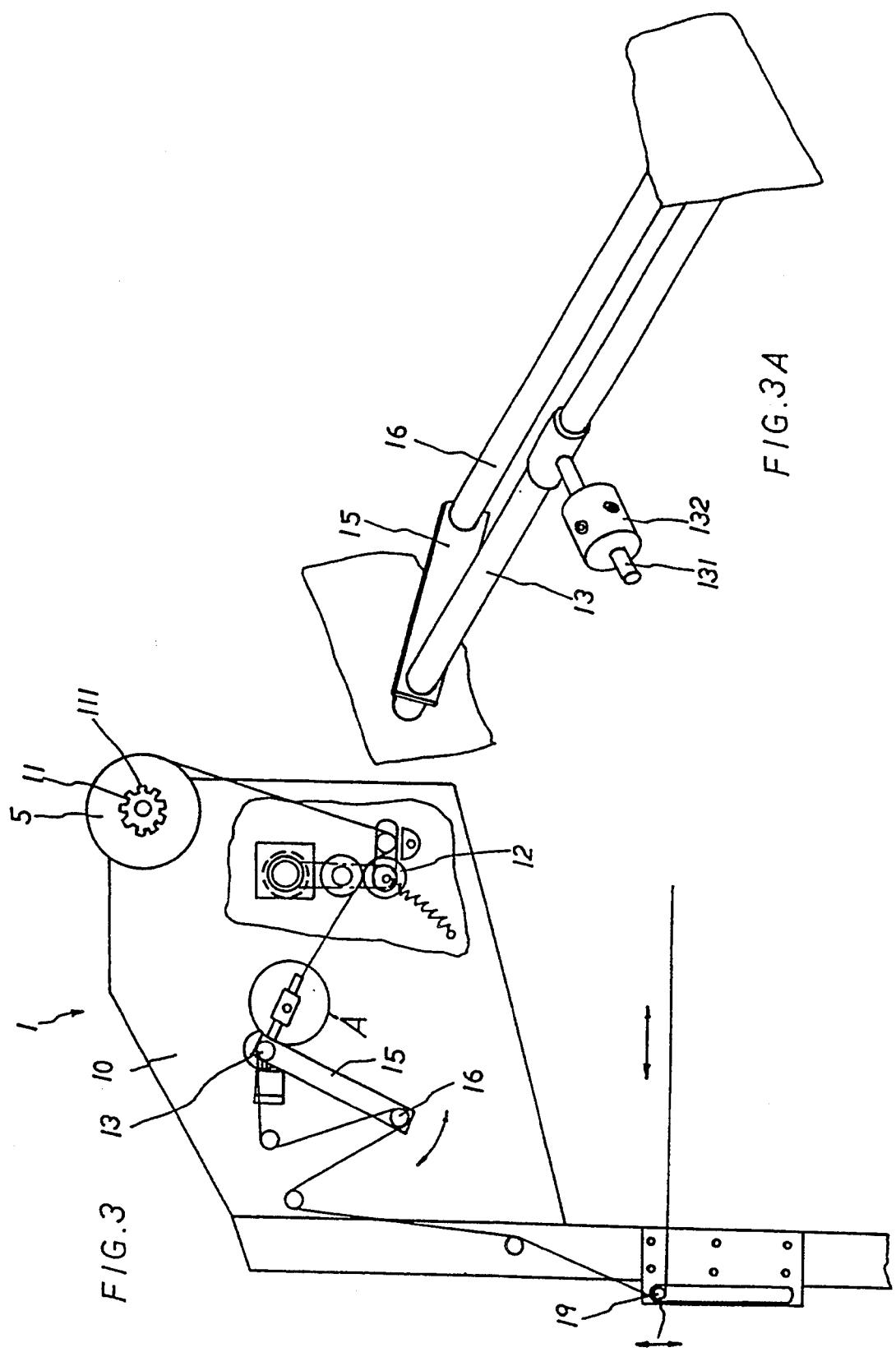
FIG. 3 shows the installation of the plastic film on the feeding system of the conventional device.
Figure 4:
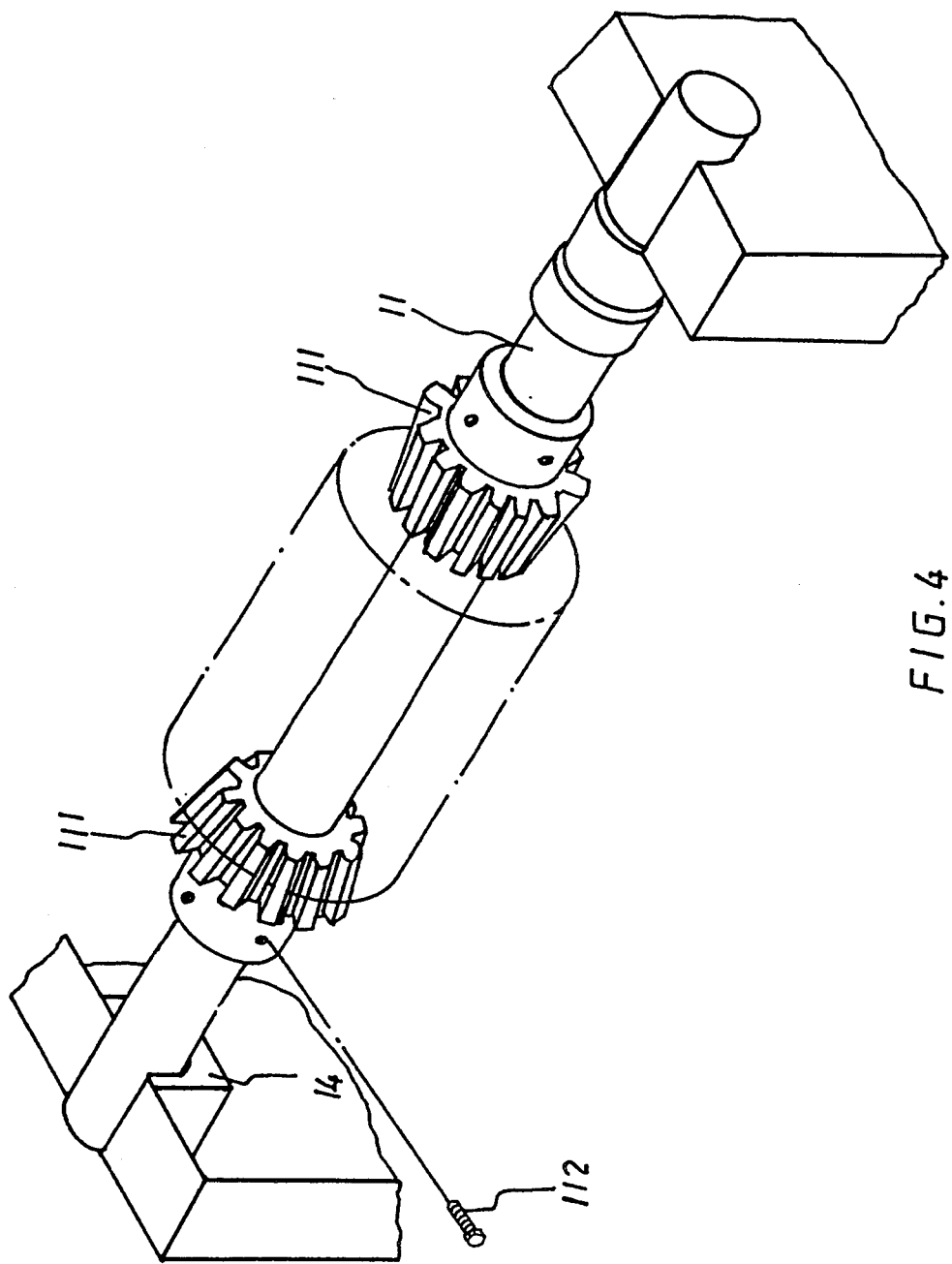
FIG. 4 shows the fixing means of the feeding system according to FIG. 4.
Figure 5:
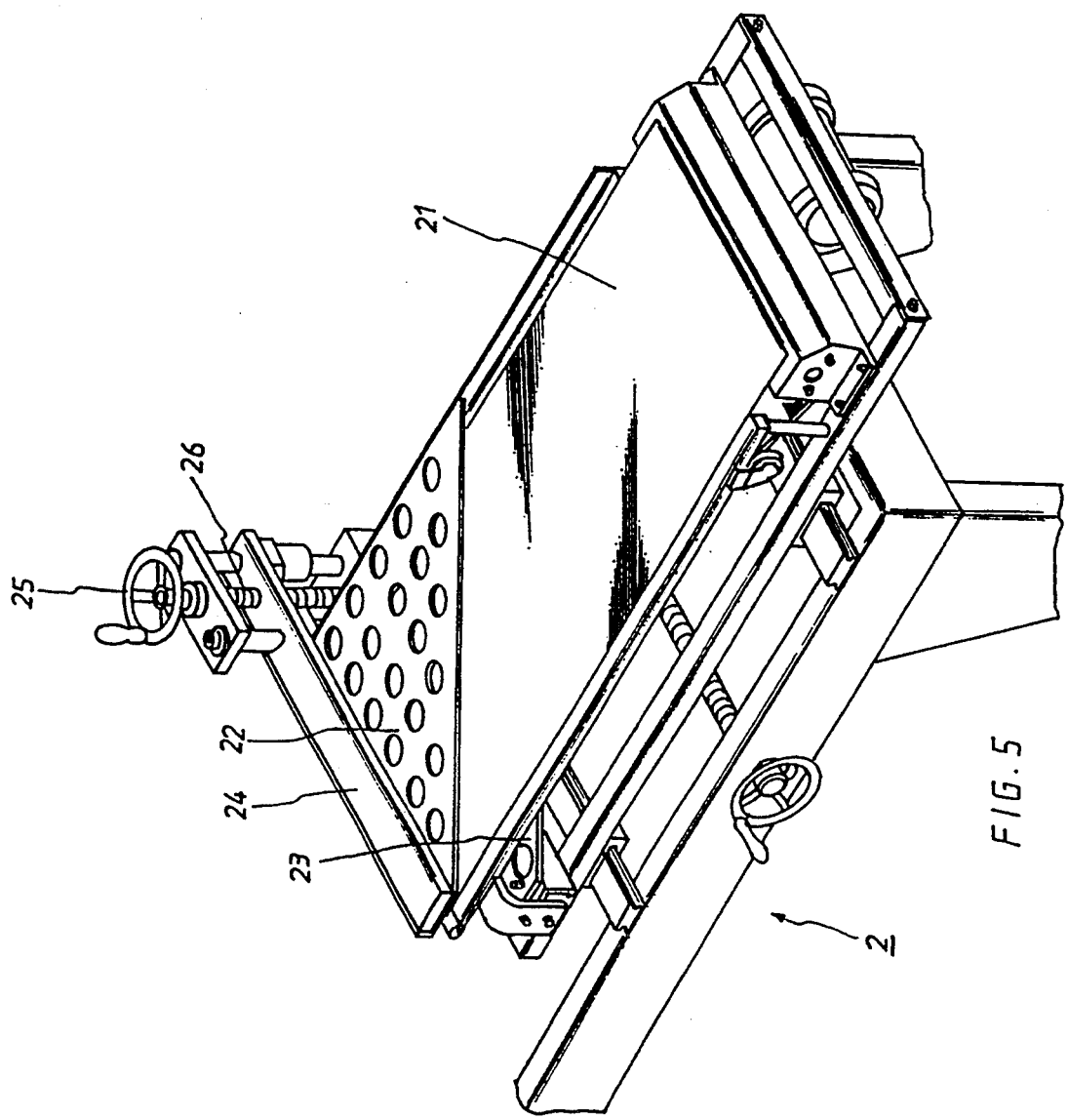
FIG. 5 shows the packing system of the conventional device.
Figure 6:
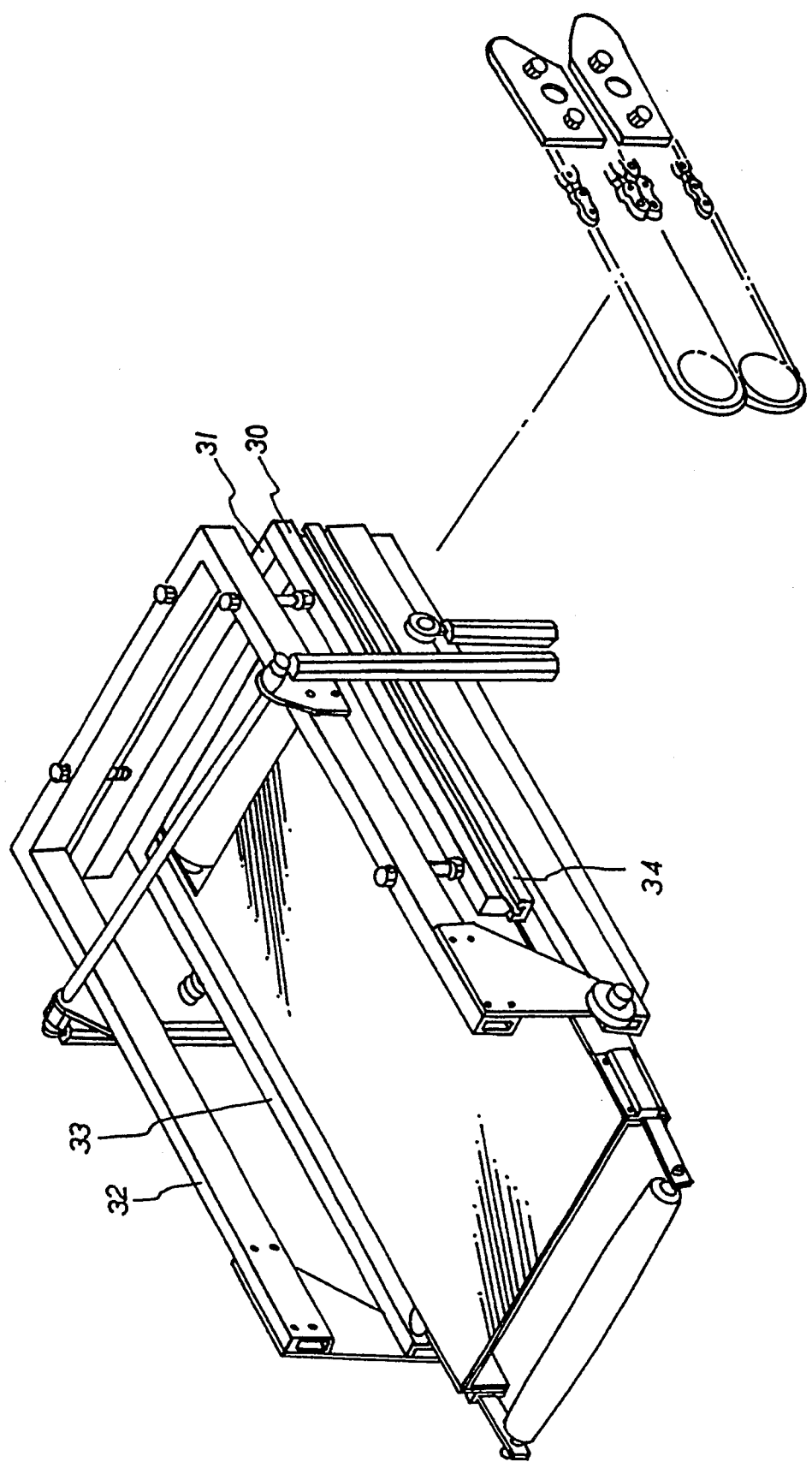
FIG. 6 shows the sealing operation according to FIG. 5.
Figure 7:
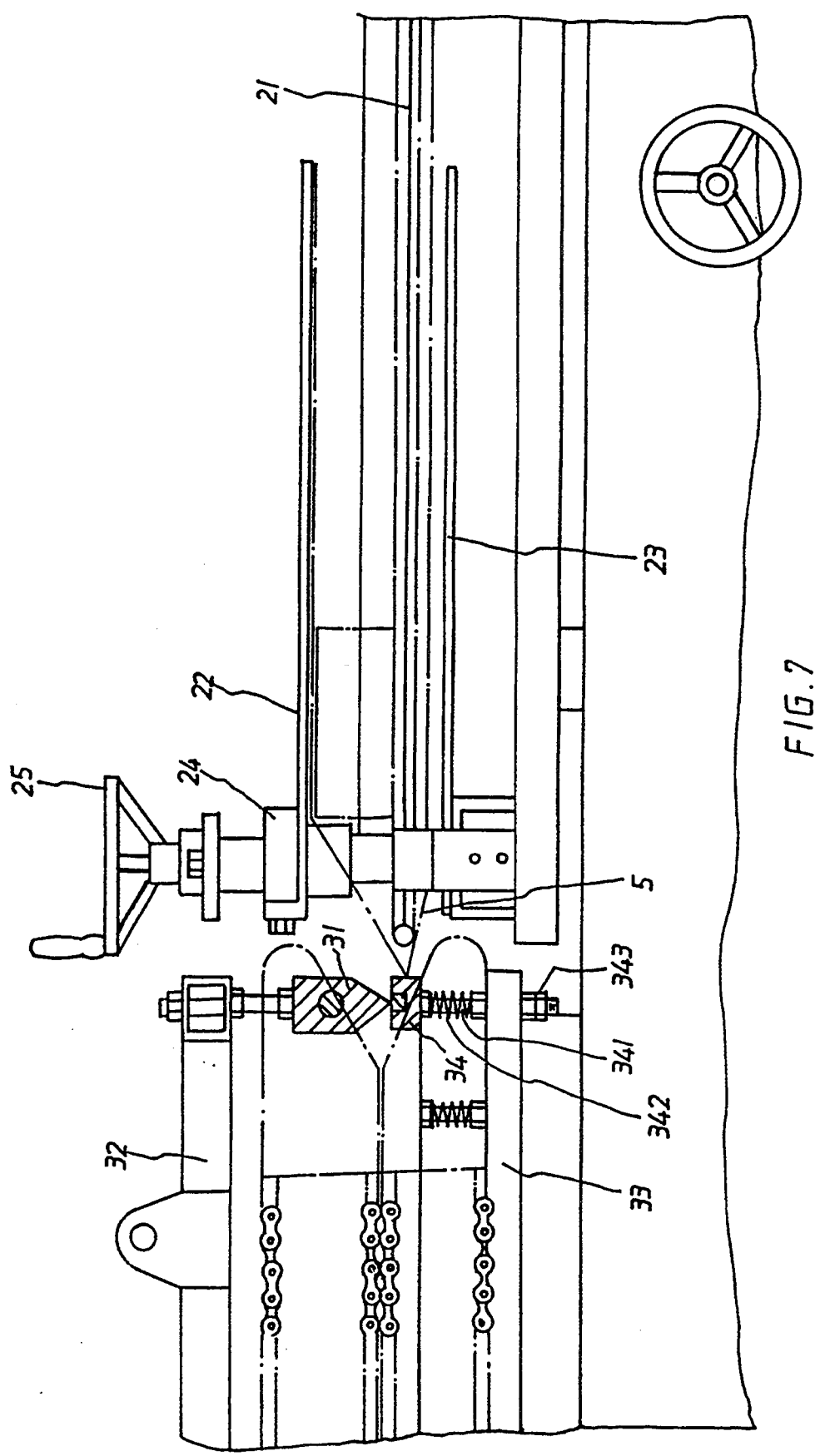
FIG. 7 shows the packing and sealing operation of the conventional device.
Figure 8:
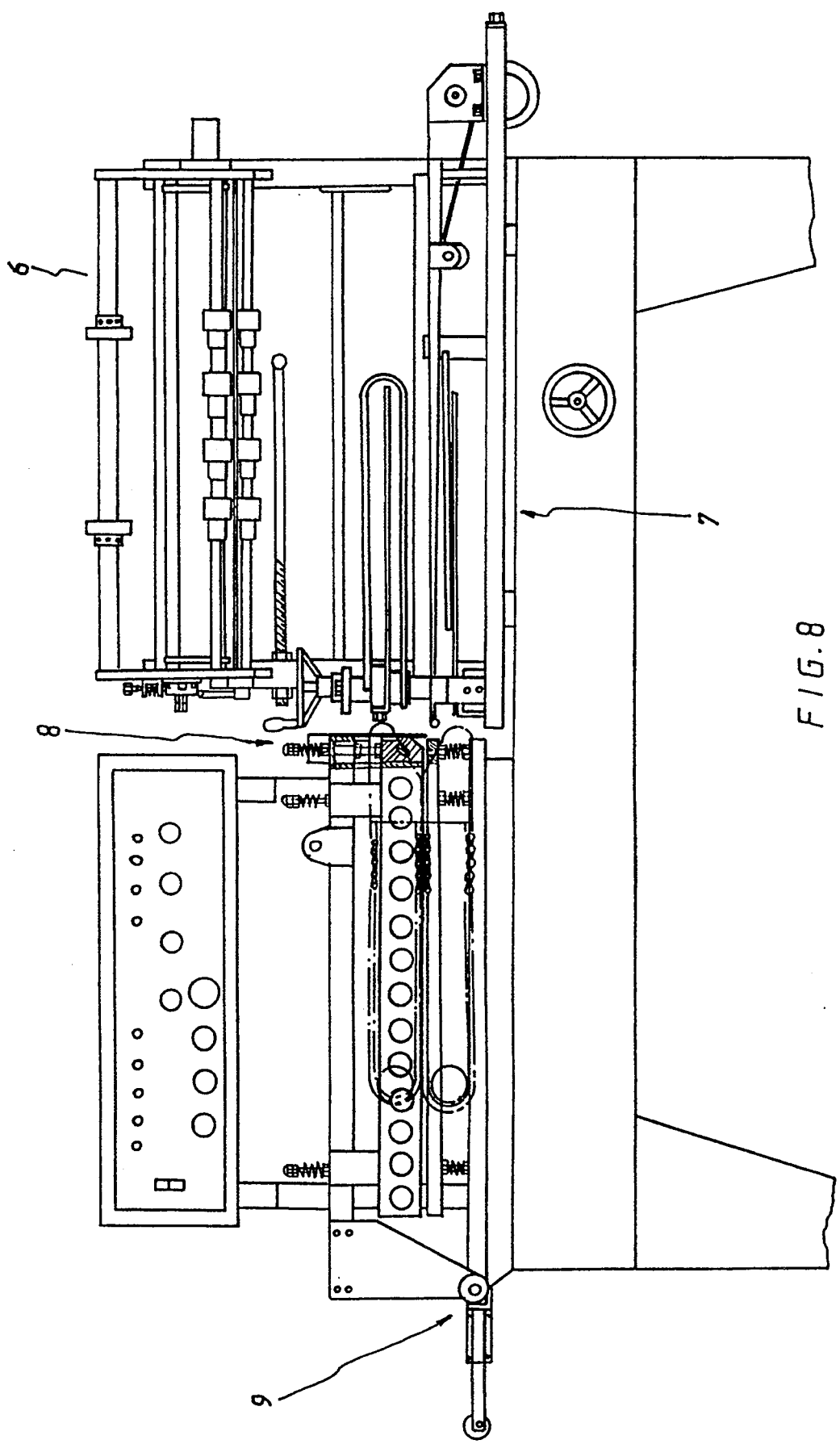
FIG. 8 is a front view of the present invention.
Figure 9:
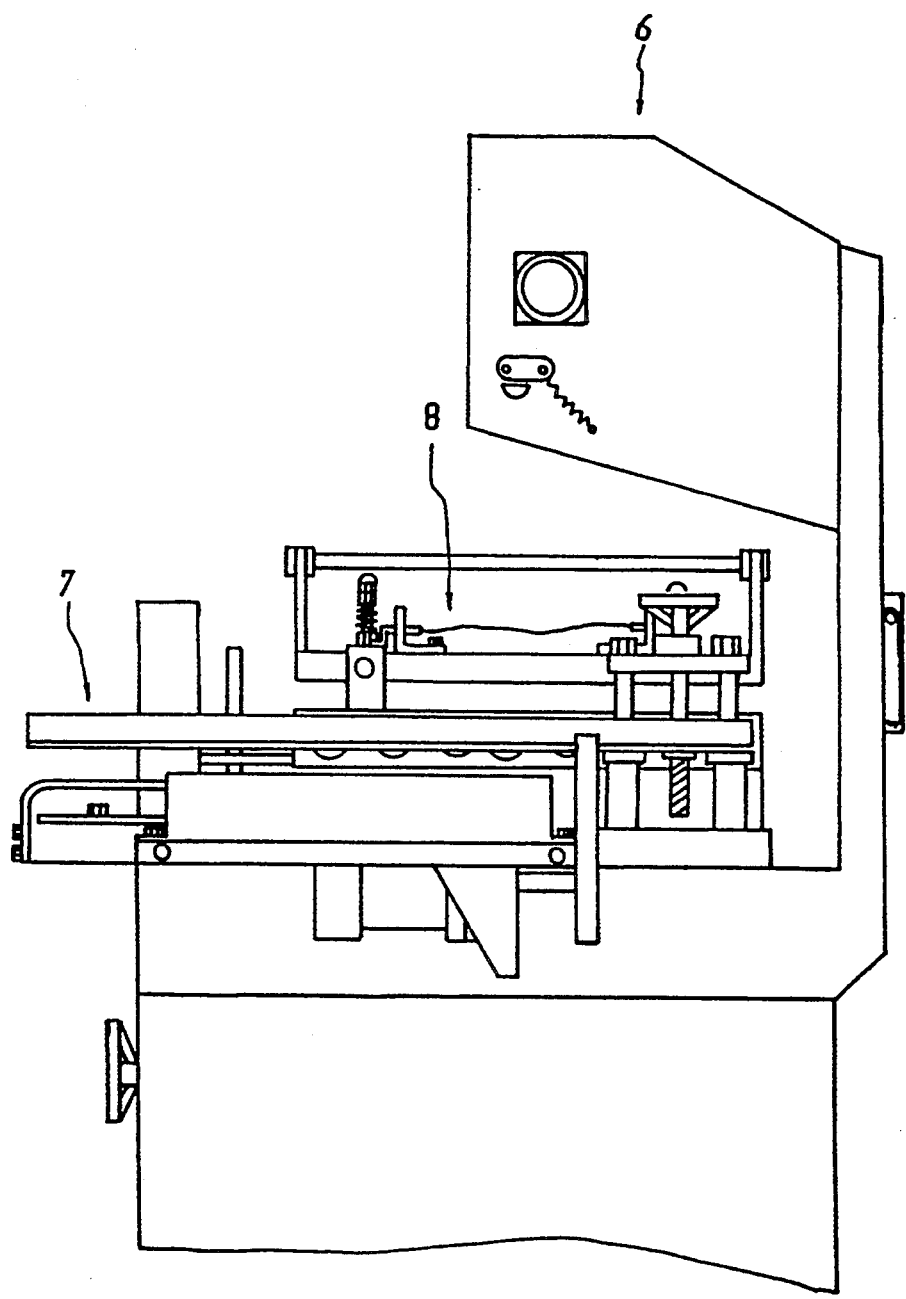
FIG. 9 is a right side view according to FIG. 8.
Figure 10:
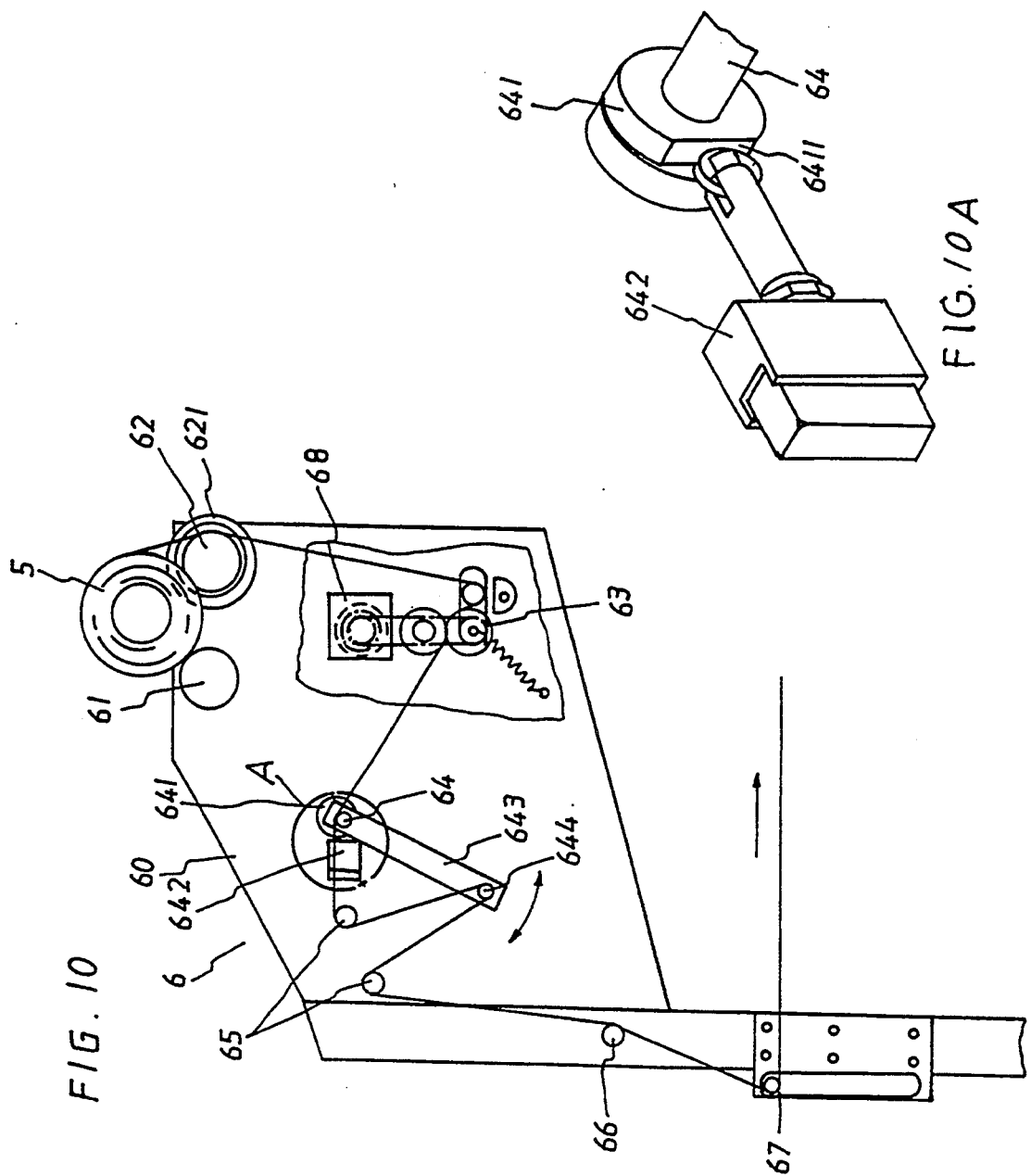
FIG. 10 shows the plastic film-feeding system of the present invention.
Figures 11, 11A:
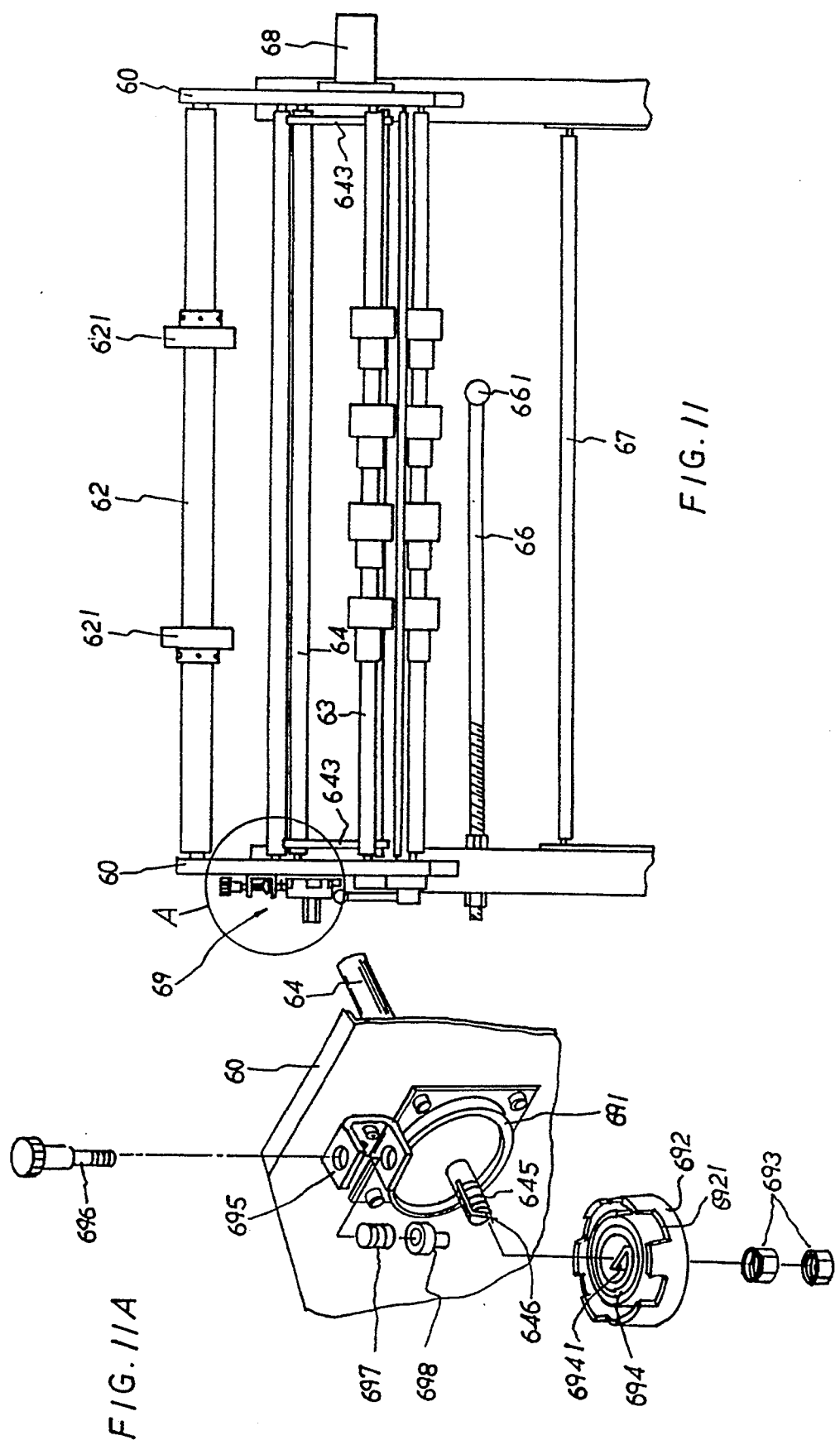
FIG. 11 shows the installation of the plastic film on the feeding system of the present invention.
FIG. 11A is a detailed exploded view of a partially broken away section of the circled area labeled A in FIG. 11.

Please refer to FIGS. 8 and 9. The present invention mainly includes a plastic film-feeding system 6, a packing system 7, a sealing system 8 and a transferring system 9. FIGS. 10 and 11 show the plastic film-feeding system 6, wherein a first roller shaft 61 and a second roller shaft 62 are disposed between two lateral walls 60. A supporting shaft 624 is extended through each of the roller shafts 61, 62 and two bearings 623 are fitted with two ends of the supporting shaft 624, permitting each of the roller shafts 61, 62 to freely rotate. Two adjusting sleeve members 621 are symmetrically freely slidably fitted on the second roller shaft 62. On an edge of each of the adjusting sleeve members 621 is formed thread holes 6210, whereby screws 622 can be screwed into the thread holes 6210 to secure the adjusting sleeve member 621 on the second roller shaft 62 as shown in FIG. 12. A plastic film drum with the plastic film 5 is placed on and between the first and second roller shafts 61, 62 and located between the two adjusting sleeve members 621, whereby by means of sliding the adjusting sleeve members 621 left and right, the position of the plastic film 5 can be adjusted for facilitating the feeding thereof.

Figure 13:
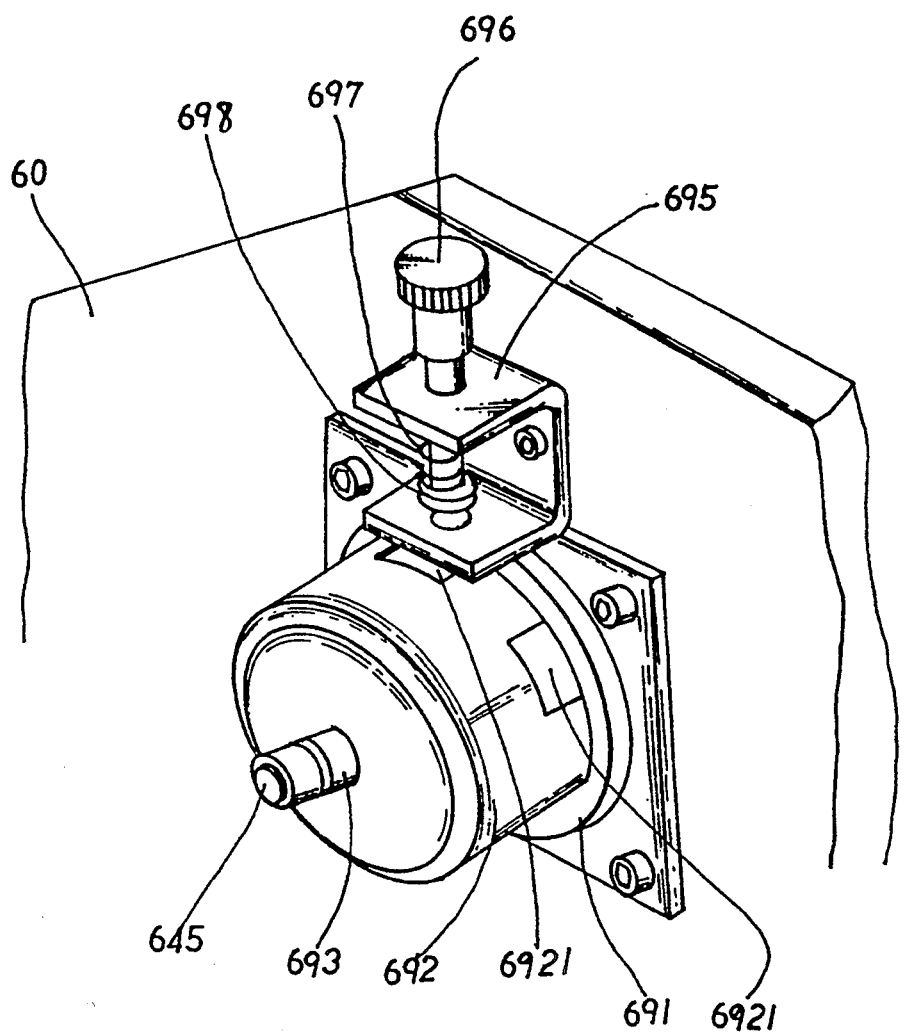
FIG. 13 further shows the tension-adjusting shaft according to FIG. 12.

Please now refer to FIGS. 10, 11 and 12. The plastic film 5 goes from the second roller shaft 62 through a plastic film-clamping/feeding roller shaft 63 in which a reduced motor 68 is used to drive the roller shaft 63 and transfer the plastic film 5. Thereafter, the plastic film 5 goes through a tension-adjusting shaft 64 and several guiding rods 644, 65, 66 and 67 to be fed into the packing system 7. On two sides of the tension-adjusting shaft 64 are disposed swinging arms 643 at an end of which the guiding rod 644 is disposed, whereby the guiding rod 644 can freely swing about the tension-adjusting shaft 64. At one end of the tension-adjusting shaft 64 is disposed an activating block 641 which is formed with a plane cut surface 6411. A trigger switch 642 is disposed closely beside the activating block 641, whereby when the tension-adjusting shaft 64 rotates, the activating block 641 rotates along therewith and a top arch surface of the activating block 641 pushes and activates the trigger switch 642, making the reduced motor 68 rotarily drive the clamping/feeding roller shaft 63 to feed the plastic film 5. In addition, one end of the tension-adjusting shaft 64 penetrates the lateral wall 60 and is formed with a thread section 645 which is cut with a fissure 646. A coil spring 694 having a central abutting plate 6941 is fitted with the thread section 645 with the central abutting plate 6941 inserted in the fissure 646. An outer surface of the coil spring 694 contacts with an inner surface of a cover member 692. The cover member 692 has a central through hole and a peripheral portion formed with multiple U-shaped recesses 6921, whereby nuts 693 are screwed with the tension-adjusting shaft 64 to associate the cover member 692 with a flange plate 691 of the lateral wall 60. A fixing means is disposed above the flange plate 691, composed of a C-shaped seat member 695, a spring 697 and a fixing rod 696. The spring 697 is disposed between an upper side of the C-shaped seat 695 and an annular projection 698 of the fixing rod 696, whereby the spring 697 can force the fixing rod 696 into the U-shaped recess 6921 of the cover member 692. (FIG. 13 shows the assembly of the fixing means and cover member 692.) Moreover, referring to FIG. 11, a stretching lever 66 is disposed between the lateral walls 60, having a thread end portion secured on the lateral wall by nuts and a ball end portion 661. The stretching lever 66 serves to force open the plastic film 5 against the attaching force due to static electricity or other factors and facilitate the transferring and packing of the plastic film 5.

According to the above arrangements, the plastic film 5 is first placed between the first and second roller shafts 61, 62 and then pulled out and extended into the clamping/feeding roller shaft 63. Thereafter, the film 5 is extended to ride over the tension-adjusting shaft 64 and wind through several guiding rods into the packing system 7.

The features of the above arrangements are as follows:

1. The plastic film 5 is placed on the first and second roller shafts 61, 62 and clamped by the adjusting sleeve members 621 of the second roller shaft 62, so that after the plastic film 5 is used up, the plastic film drum can be taken away from the roller shafts 61, 62 and a new one can be placed thereon for further operation. In contrast with the above, in conventional device, the replacement of the plastic film will includes the following troublesome steps of taking away a shaft for mounting the plastic film, detaching a fixing means, replacing the plastic film, re-securing the fixing means and re-installing the shaft.

2. The plastic film is placed between the first and second roller shafts 61, 62 so that during use, the film drum does not contact with the roller Shafts 61, 62 and thus the film drum is free from abrasion against the roller shafts and can be recovered. Therefore, the using life of the film drum is prolonged and the manufacturing cost is lowered.

3. During the packing and sealing operation, the needed size of the plastic film and the value of the tension controlled by the tension-adjusting shaft will vary according to the the dimension of the article to be packed. In the present invention, when starting the operation, by means of the fixing rod 696 of the tension-adjusting shaft 64, the U-shaped recesses 6921 of the cover member 692 can be controlled to make the coil spring 694 in the cover member 692 control the restoring force of the tension-adjusting Shaft 64. In contrast with the above, in the conventional device, the tension is adjusted in such a manner that the the operation must be repeatedly stopped for adjusting the tension and then the operation is repeatedly re-started for testing the tension until an appropriate tension is obtained.

Figure 14:
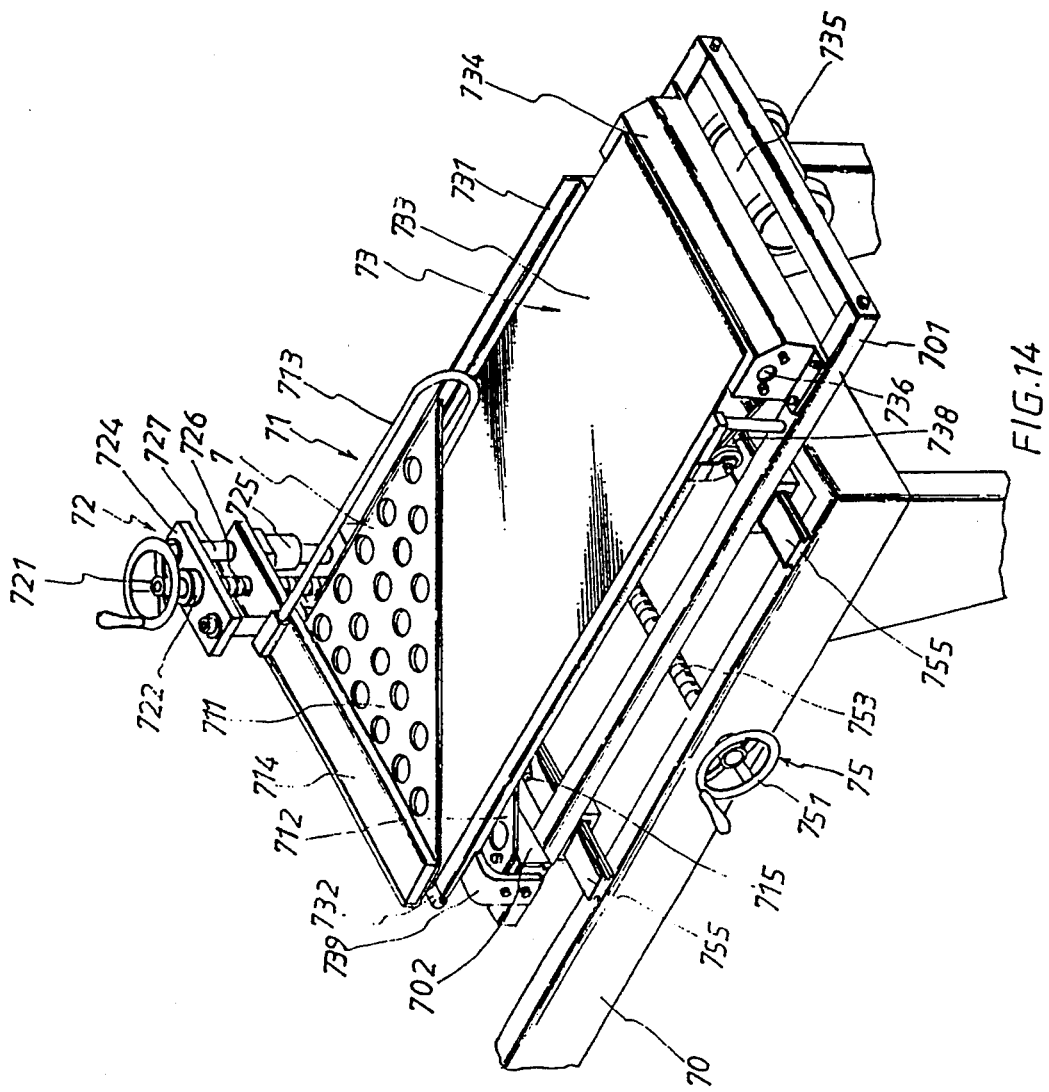
FIG. 14 is a perspective view of the packing system of the present invention.
Figure 15:
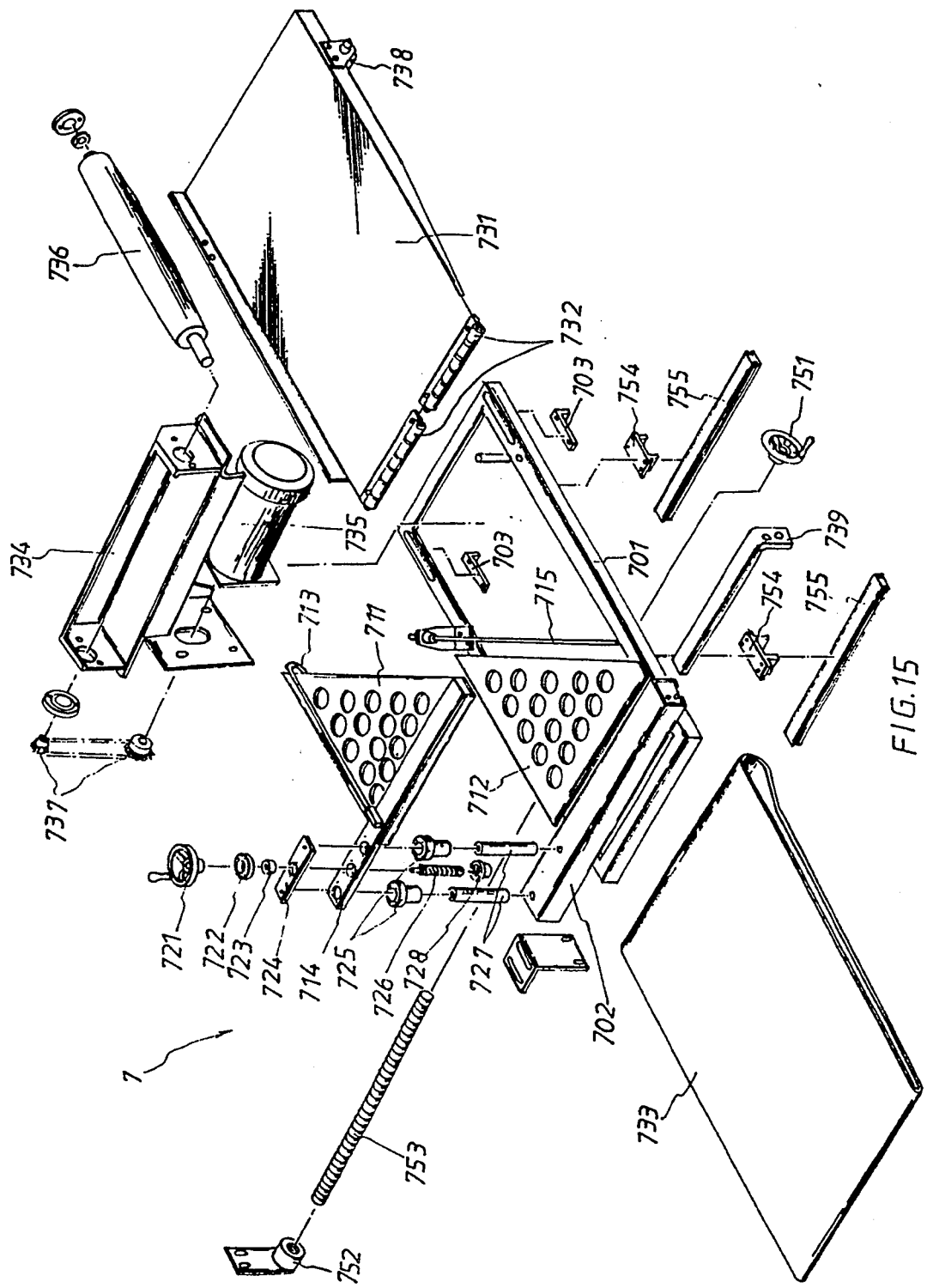
FIG. 15 is an exploded view according to FIG. 14.
Figure 16:
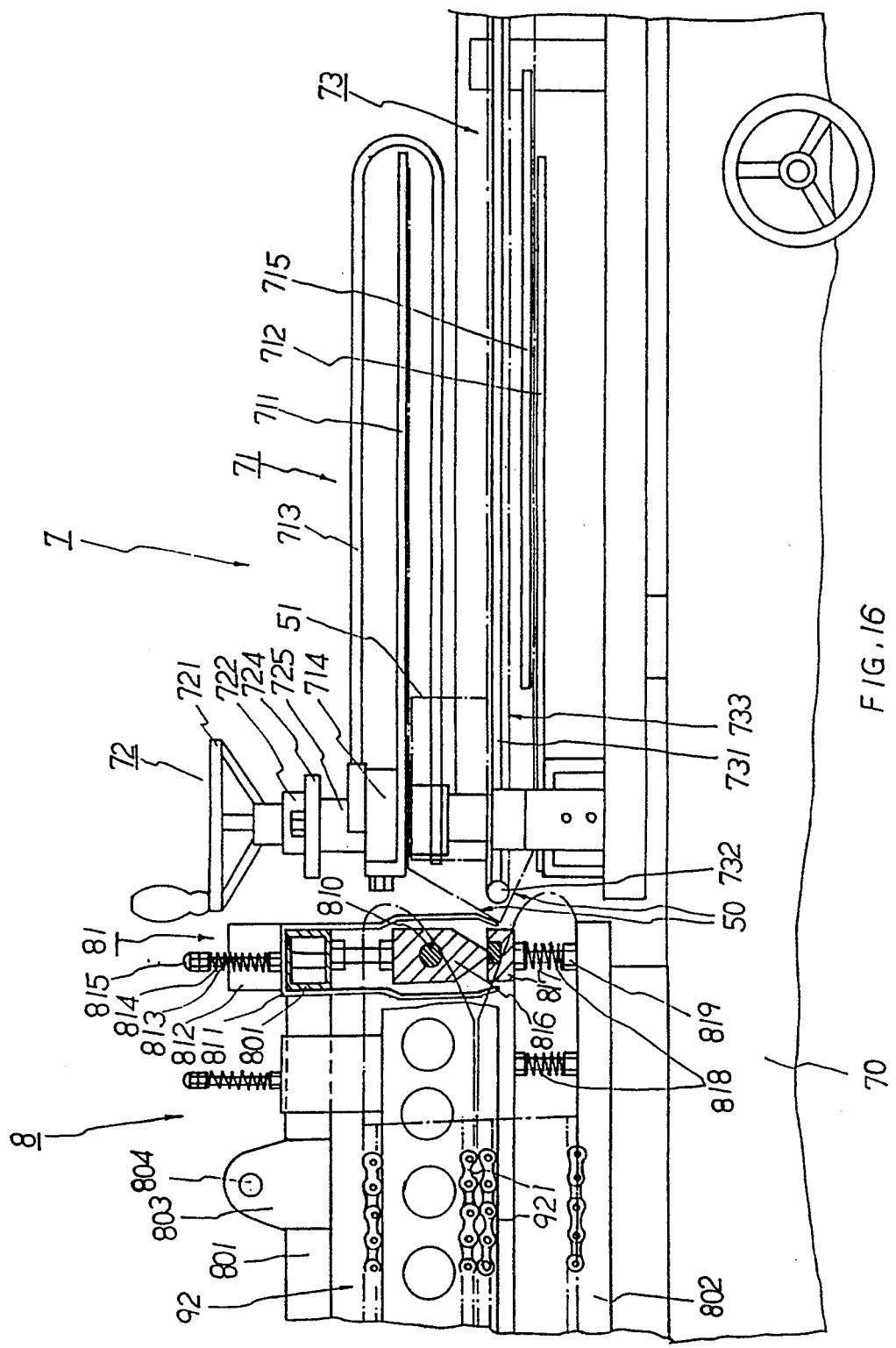
FIG. 16 shows the operation of the packing system of the present invention.

Please now refer to FIGS. 14 and 15 which show the packing system 7 of the present invention. When the plastic film 5 is fed from the feeding system 6 into the packing system 7, the film is double folded into an upper and a lower sheets. Two slide rails 755 are disposed on a support body 70 of the packing system 7 and multiple linear bearings 754 are fixed on a frame body 701 of a front conveying belt corresponding to the slide rails 755. A thread sleeve 752 is fixed on a rear portion of the frame body 701 and one end of a thread rod 753 is screwed in the thread rod 752. The other end of the thread rod 753 is connected with a wheel 751, whereby when rotating the wheel 751, the whole conveying belt structure can be moved forward and backward. In addition, a lower triangular turning guiding board 712 is disposed on a transverse seat 702 located on the frame body 701 and two guiding rods 727 are disposed at one end of the transevers seat 702. An adjusting thread rod 726 is disposed between the guiding rods 727. An upper triangular turning guiding board 711 is disposed on an upper transverse rod 714 and a substantially U-shaped stretching lever is disposed on one side of the upper turning guiding board 711. Under one end of the upper transverse rod 714 are fixed two sleeves 725 and a sleeve 728 having inner thread for the thread rod 726. The two guiding rods 727 and the thread rod 726 are respectively extended through the sleeves 725 and the sleeve 728. The other ends of the guiding rods 727 are fixed on a fixing board 724, while the thread rod 726 extends through the sleeve 728 to connect with two sleeves 722, 723 and a wheel 721. Accordingly, when rotating the wheel 721 left and right, the upper triangular turning guiding board 711 can be moved up and down (to adjust the distance between the upper triangular turning guiding board 711 and the front conveying belt). The front conveying belt assembly 73 is positioned between the upper and lower triangular turning guiding boards 711, 712, including a conveying face board 731, two sets of front pulleys 732 disposed at a front end of the conveying face board 731, an idle roller 738 disposed above a rear end of the conveying face board 731, a hood member 734 is fixed on the frame body 701 behind the conveying face board 731, a main pulley 736 disposed in the hood member 734 and a conveying belt 733 wound on the above pulleys and idle roller. A motor 734 and sprockets 737 are used to drive the pulleys for transferring the artcile. It should be noted that a blowing tube 715 is diagonally fixed on the frame body 701 under the front conveying belt assembly 73. The blowing tube 715 is formed with multiple blowing holes, whereby an operator can blow diagonally inwardly through the blowing holes (in the direction parallel to a diagonal side of the lower triangular turning guiding board 712). Therefore, the assembly (as shown in FIG. 14) works as shown in FIG. 16, wherein the upper sheet of the folded plastic film 5 goes through the diagonal side of the upper turning guiding board 711 and turns 90 degrees, while the lower sheet of the folded plastic film 5 goes through the diagonal side of the lower turning guiding board 712 and turns 90 degrees. Therefore, the upper and lower sheets of the folded plastic film 5 are turned 90 degrees during the transferring process by means of the Upper and lower triangular turning guiding boards 711, 712 and meet at a transverse sealing blade 81 of the sealing system 8. Therefore, an article is conveyed to a position under the upper turning guiding board 711 by means of the conveying belt assembly 73. (The level of the upper turning guiding board 711 can be controlled by the upper transverse rod 714 go as to adjust the distance between the conveying belt assembly 73 and the upper turning guiding board 711, making the article pass therethrough smoothly.) When the article goes between the conveying belt assembly 73 and the upper turning guiding board 711 and is spaced from the transverse sealing blade by a certain distance, the sealing blade 816 will be pressed down to thermally seal a front end portion of the plastic film in front of the article. At this time, the lateral open ends of the plastic film 5 are clamped on a clamping/feeding chain assembly 92 and the same continuously clamps and pulls the plastic film forward. Therefore, the plastic film 5 and the article will go forward simultaneously and pass through the transverse sealing blade 816. After a rear end of the article passes through the sealing blade 816 for a certain distance, the sealing blade 816 is again pressed down to seal the rear and lateral ends of the plastic film 5 and thus make the article totally sealedly enveloped by the plastic film 5 and complete the packing and sealing process. During the sealing process, the blowing tube 715 disposed under the front conveying belt assembly 73 can be used to blow air into the plastic film 5 to expand the plastic film 5 on the upper turning guiding board 711 and permit the article on the front conveying belt assembly 73 to be packed closer to the transverse sealing blade 816. As a result, the material can be saved and the package will be more impacted with desired appearance.

Figure 17:
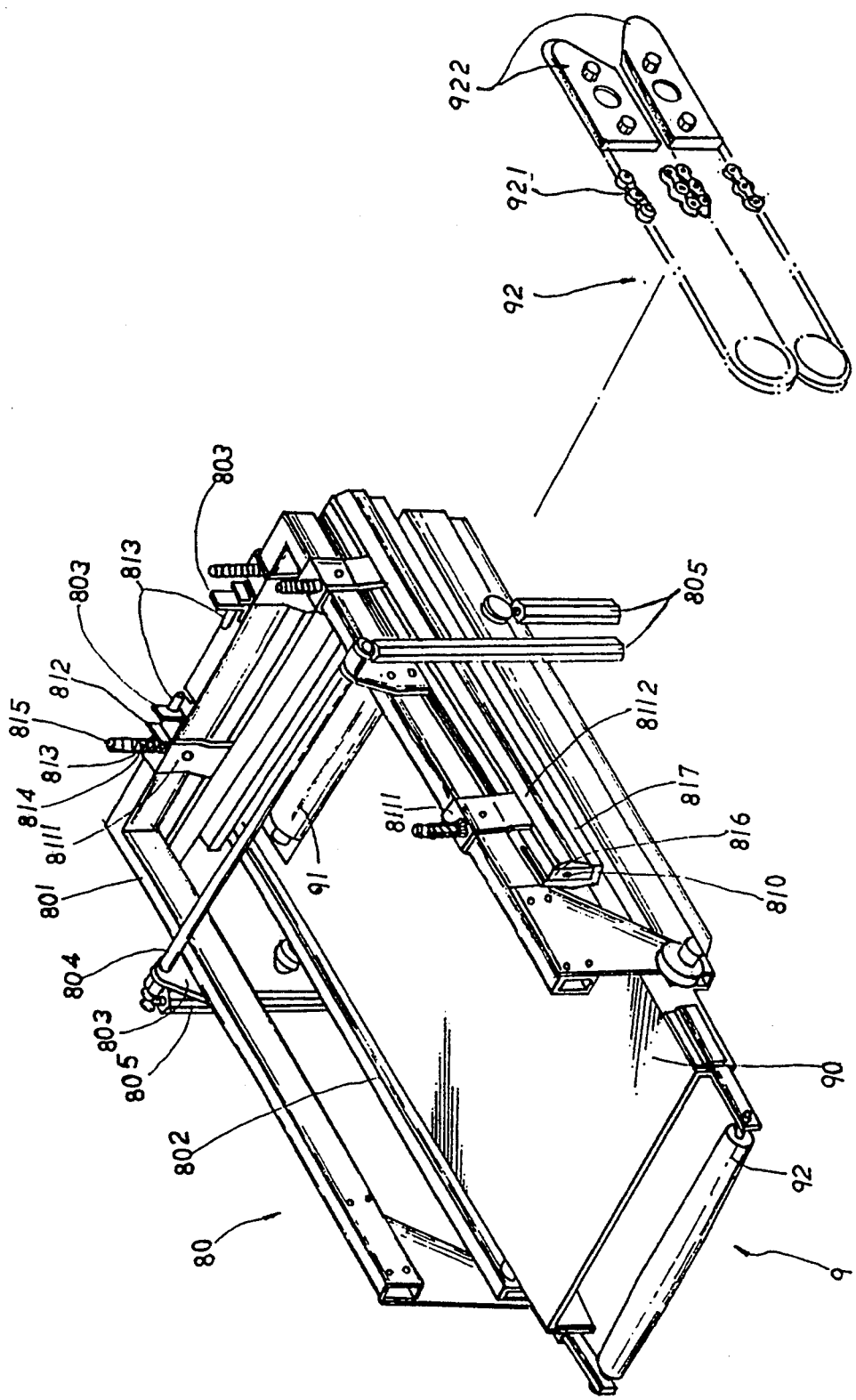
FIG. 17 is a perspective view of the sealing system of the present invention.
Figure 18:
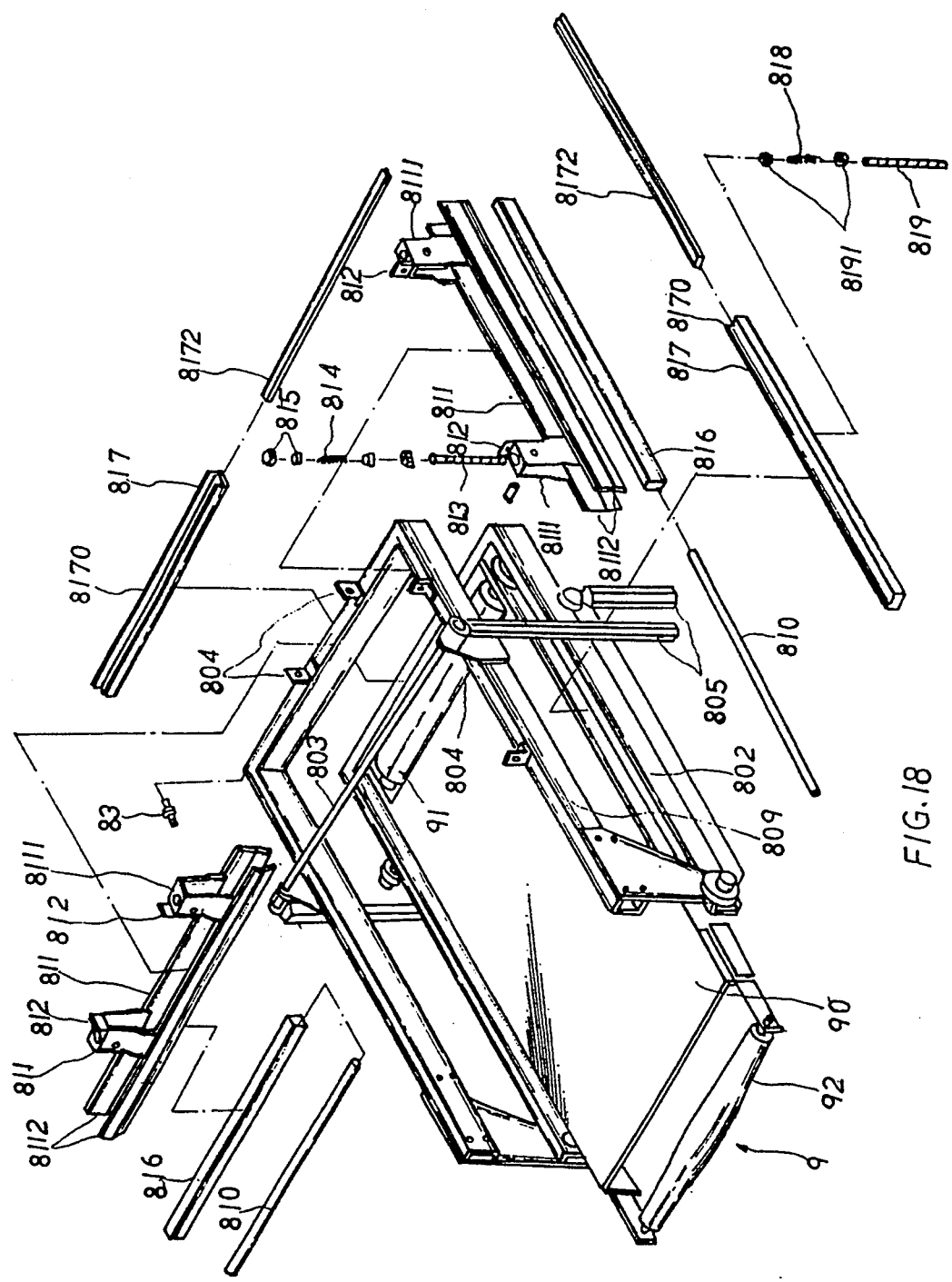
FIG. 18 is an exploded view according to FIG. 17.

Please now refer to FIGS. 17 and 18 which show the sealing system 8 and transferring system 9 of the present invention, wherein a main pulley 91 is disposed at a front end of a support body 90 of the transferring system 9 and a rear pulley 92 is disposed at a rear end of the support body 90. A conveying belt is disposed on the pulleys and an upper and a lower substantially U-shaped swinging arms 801, 802 are disposed on two sides of the rear end of the support body 90. The upper and lower swinging arms 801, 802 are pivotally connected and can be displaced in opposite directions by two pushing levers 805. Therefore, the upper and lower swinging arms 801, 802 can be moved apart or toward each other into a parallel state. Two pairs of opposite sensing switch seats 803 are disposed at a front end of the upper swinging arm 801 and on two sides thereof and sensing switches 83 are respectively disposed on the sensing switch seats 803. The transverse and longitudinal sealing blades 816 are fixed under the upper swinging arm 801 by screws and a heating tube 810 is disposed in each of the blades 816 so as to heat the same for thermally sealing operation. On two sides of each of the sealing blades 816 are disposed activating plates 8112 which are connected by a substantially U-shaped connecting seat 8111. A pair of opposite sensing plates 812 are fixed above the left and right connecting seats 8111 and the left and right connecting seats 8111 are formed with through holes through which a guiding rod 813 of the upper swinging arm 801 is extended. A spring 814 is fitted on the guiding rod 813 and two nuts 815 are secured at an upper end of the guiding rod 813 so as to buffer the vertical reciprocating movement of the activating plates 8112. A sealing seat 817 is disposed above the lower swinging arm 802. The sealing seat 817 is formed with a groove 8170 in which a silicone pad 8172 is installed. Multiple thread rods 819 are disposed on two sides of a lower portion of the sealing seat 817 and a spring 818 is fitted with each thread rod 819. The thread rod 819 penetrates the lower swinging arm 802 to be secured by two nuts so that the sealing seat 817 is able to vertically reciprocate. The transferring system 9 is disposed beside the sealing system 8, including an upper and a lower sets of sprockets 922 and clamping-/feeding chains 921 wound thereon, whereby the plastic film 5 can be clamped and conveyed forward by the chains 921 as shown in FIG. 17.

Figure 19:
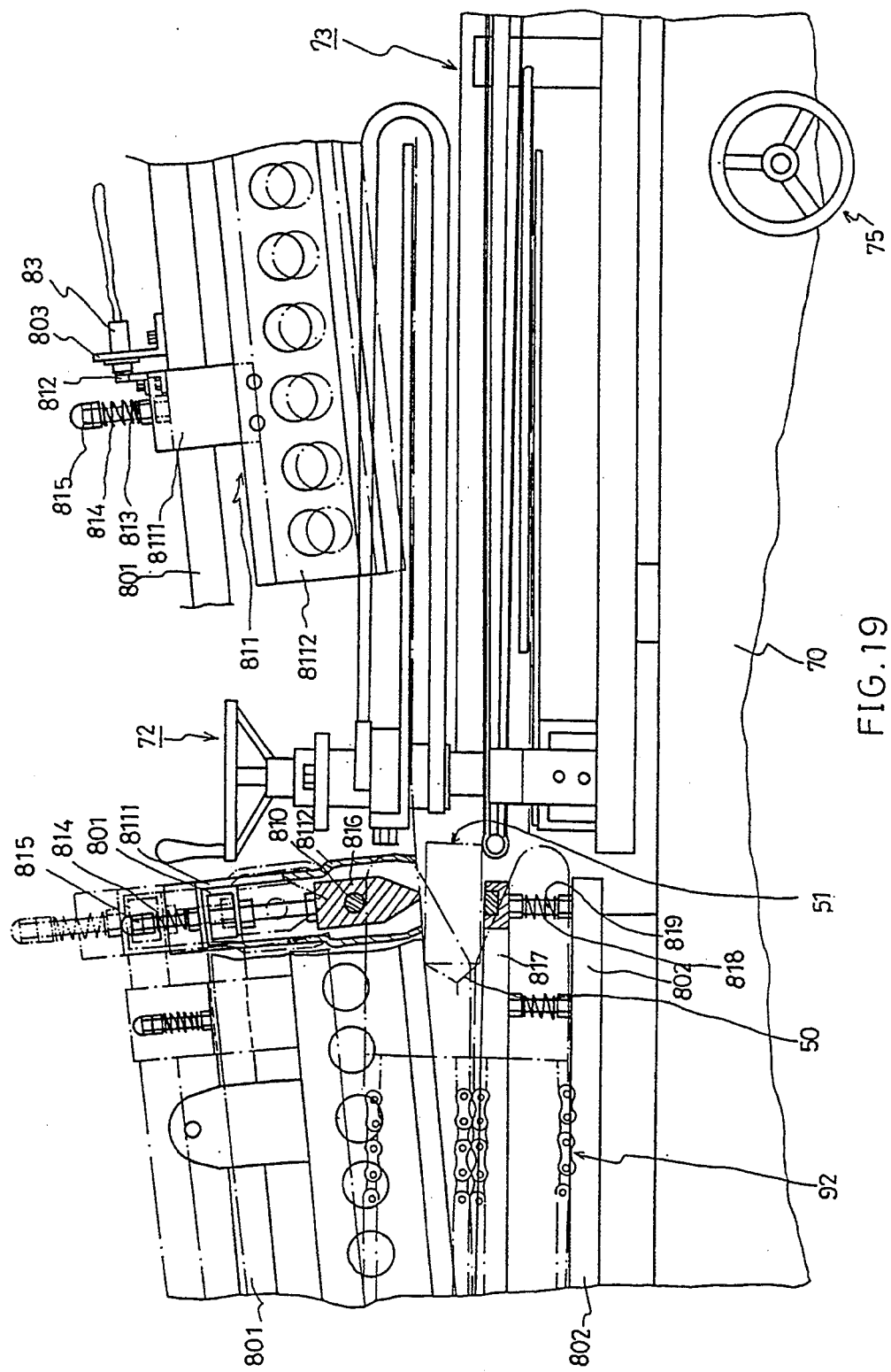
FIG. 19 shows the operation of the sealing system of the present invention.

Please refer to FIG. 19 which shows the operation of the sealing system 8 and transferring system 9. During the conveying process, if the article 51 does not completely pass through the transverse sealing blade 816 or is too close to the longitudinal sealing blade 816, or an unnecessary article or the operator incautiously extends his hand into a position under the sealing blade 816, when the upper swinging arm 801 is moved downward, before the sealing blades 816 touch the article, the activating plates 8112 beside the blades 816 will first touch the article and be moved upward. As a result, the sensing plates 812 connected with the connecting seats 8111 of the activating plates 8112 will ascend along therewith and get close to the sensing switches 83, making the same sense and emit a signal so as to emergently stop the sealing system for ensuring the safety of the operator, reducing loss of the article and protect the packing and sealing apparatus.

The present invention has been described in its preferred form with a certain degree of particularity. It is understood that the present disclosure has been made only by way of example and numerous changes in the details of construction, fabrication and use may be made without departing from the spirit and scope of the invention.

What is claimed is:

1. An antomatic packing and sealing apparatus comprising a plastic film-feeding system, a packing system, a sealing system and a transferring system, wherein:

said plastic film-feeding system includes a first roller shaft and a second roller shaft which are disposed between two lateral walls and a supporting shaft is extended through each of said roller shafts and two bearings are fitted with two ends of said supporting shaft, permitting each of said roller shafts to freely rotate, two adjusting sleeve members being symmetrically freely slidably fitted on said second roller shaft, on an edge of each of said adjusting sleeve members being formed thread holes, whereby screws are screwed into said thread holes to secure said adjusting sleeve member on said second roller shaft, one end of a tension-adjusting shaft penetrating one of said lateral walls and being formed with a thread section which is cut with a fissure, a coil spring having a central abutting plate being fitted with said thread section with the central abutting plate inserted in said fissure, an outer surface of said coil spring contacting an inner surface of a cover member, said cover member having a central through hole and a peripheral portion formed with multiple U-shaped recesses, whereby nuts are screwed with said tension-adjusting shaft to associate said cover member with a flange plate of said lateral wall, a fixing means being disposed above said flange plate and composed of a C-shaped seat member, a spring and a fixing rod, said spring being disposed between an upper side of said C-shaped seat and an annular projection of said fixing rod, whereby said spring is able to force said fixing rod into said U-shaped recess of said cover member, a stretching lever being disposed between said lateral walls and having a thread end portion secured on said lateral wall by nuts and a ball end portion;

said packing system includes two slide rails which are disposed on a support body, multiple linear bearings being fixed on a frame body of a front conveying belt corresponding to said slide rails, a thread sleeve being fixed on a rear portion of said frame body and one end of a thread rod being screwed in said thread rod, the other end of said thread rod being connected with a wheel, whereby when rotating said wheel, the whole conveying belt structure can be moved forward and backward, a lower triangular turning guiding board being disposed on a transverse seat located on said frame body, an upper triangular turning guiding board being disposed on an upper transverse rod and a substantially U-shaped stretching lever being disposed on one side of said upper turning guiding board, a blowing tube being diagonally fixed on said frame body under said front conveying belt assembly, said blowing tube being formed with multiple blowing holes, whereby an operator is able to blow diagonally inwardly through said blowing holes in the direction parallel to a diagonal side of said lower triangular turning guiding board; and said-sealing system and transferring system include an upper and a lower substantially U-shaped swinging arms which are disposed on two sides of said rear end of said support body, said upper and lower swinging arms being pivotally connected, two pairs of opposite sensing switch seats being disposed at a front end of said upper swinging arm and on two sides thereof and sensing switches being respectively disposed on said sensing switch seats, said transverse and longitudinal sealing blades being fixed under said upper swinging arm by screws, on two sides of each of said sealing blades being disposed activating plates which are connected by a substantially U-shaped connecting seat, a pair of opposite sensing plates being fixed above said left and right connecting seats and said left and right connecting seats being formed with through holes through which a guiding rod of said upper swinging arm is extended, a spring being fitted on said guiding rod and two nuts being secured at an upper end of said guiding rod so as to buffer vertical reciprocating movement of said activating plates, whereby during the sealing process, said blowing tube disposed under said front conveying belt assembly is used to blow air into the plastic film to expand said plastic film on said upper turning guiding board and permit the article on said front conveying belt assembly to be packed closer to said transverse sealing blade for saving material and making the package more impacted, and whereby during the conveying process, if the article does not completely pass through said transverse sealing blade or is too close to said longitudinal sealing blade or an unnecessary article or the operator incautiously extends his hand into a position under said sealing blade, when said upper swinging arm is moved downward, before said sealing blades touch the article, said activating plates beside said blades will first touch the article and be moved upward, so that said sensing plates connected with said connecting seats of said activating plates will ascend along therewith and get close to said sensing switches, making the same sense and emit a signal so as to emergently stop said sealing system for ensuring the safety of the operator, reducing loss of the article and protect said packing and sealing apparatus.

* * * * *